United States Patent
De Villele et al.

(10) Patent No.: US 10,922,985 B2
(45) Date of Patent: Feb. 16, 2021

(54) SYSTEMS AND METHODS FOR DYNAMIC IMPLEMENTATION OF INCREASED GLIDE SLOPE ANGLES IN APPROACH PROCEDURES

(71) Applicant: HONEYWELL INTERNATIONAL INC., Morris Plains, NJ (US)

(72) Inventors: Dorothee De Villele, Haute-Garonne (FR); Daniel Corbel, Haute-Garonne (FR); Rajesh Chaubey, Karnataka (IN); Marek Batelka, Tisnov (CZ); Pavel Ptacek, Rosice (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 19 days.

(21) Appl. No.: 15/970,225

(22) Filed: May 3, 2018

(65) Prior Publication Data
US 2019/0340941 A1 Nov. 7, 2019

(51) Int. Cl.
*G08G 5/02* (2006.01)
*B64D 45/08* (2006.01)
*G08G 5/00* (2006.01)

(52) U.S. Cl.
CPC .......... *G08G 5/025* (2013.01); *B64D 45/08* (2013.01); *G08G 5/0021* (2013.01)

(58) Field of Classification Search
None
See application file for complete search history.

(56) References Cited

U.S. PATENT DOCUMENTS

| | | | |
|---|---|---|---|
| 6,691,004 B2* | 2/2004 | Johnson | G01C 5/005 340/945 |
| 6,711,479 B1* | 3/2004 | Staggs | G05D 1/0676 244/187 |
| 6,980,892 B1* | 12/2005 | Chen | G01C 21/005 340/970 |
| 8,184,020 B2 | 5/2012 | He | |
| 8,660,722 B2 | 2/2014 | Dumoulin et al. | |
| 8,924,047 B2 | 12/2014 | Dewas et al. | |
| 9,098,999 B2 | 8/2015 | Snow et al. | |

(Continued)

OTHER PUBLICATIONS

De Villele, D. et al.; Systems and Methods for Dynamic Selection of Advanced Approach Procedures; filed with the USPTO Jul. 5, 2017 and assigned U.S. Appl. No. 15/641,525.

*Primary Examiner* — Dale W Hilgendorf
*Assistant Examiner* — Alexander C. Bost
(74) *Attorney, Agent, or Firm* — Lorenz & Kopf, LLP

(57) ABSTRACT

Systems and methods directed to evaluating and enabling enhanced glide slope angles are provided. The method includes, in a control module, identifying a designated glide slope angle (D_GSA) based on a designated approach procedure; receiving and processing sensor data and navigation data; and, generating an adaptive glide slope angle (A_GSA) and an associated final capture altitude (FCA) based thereon. The method includes determining whether (a) an altitude constraint applies at the FCA, and determining whether (b) a level segment exists at the FCA. When (a) and (b) are concurrent, the method enables modification of the designated approach procedure with the A_GSA; and, the method prevents modification of the designated approach procedure with the A_GSA when there is no concurrence of (a) and (b).

16 Claims, 6 Drawing Sheets

(56) References Cited

U.S. PATENT DOCUMENTS

| | | |
|---|---|---|
| 9,257,050 B2 | 2/2016 | Fleiger-Holmes et al. |
| 9,547,312 B2 | 1/2017 | Buisson et al. |
| 2007/0010921 A1 | 1/2007 | Ishihara et al. |
| 2010/0079308 A1* | 4/2010 | Fabre .................. G08G 5/0086 340/951 |
| 2012/0232725 A1 | 9/2012 | Dumoulin et al. |
| 2014/0343760 A1* | 11/2014 | Le Gall .................... G08G 5/02 701/4 |
| 2014/0343764 A1* | 11/2014 | Sacle ..................... B64D 45/04 701/16 |
| 2014/0343766 A1* | 11/2014 | Le Gall ................. B64D 45/04 701/18 |
| 2016/0085239 A1* | 3/2016 | Boyer .................. G05D 1/0676 701/5 |
| 2016/0275800 A1* | 9/2016 | Boulle ................. G08G 5/0039 |
| 2017/0032683 A1* | 2/2017 | Meserole, Jr. ....... G08G 5/0043 |
| 2017/0124886 A1 | 5/2017 | Ishihara et al. |
| 2017/0162067 A1* | 6/2017 | Rouquette ............ G08G 5/0021 |
| 2017/0249851 A1* | 8/2017 | Marques ............. G08G 5/0021 |
| 2018/0120850 A1* | 5/2018 | McLees ............... G05D 1/0202 |
| 2018/0148192 A1* | 5/2018 | Haskins ................ B64D 45/04 |
| 2018/0197422 A1* | 7/2018 | Arethens ................ G08G 5/025 |
| 2018/0281988 A1* | 10/2018 | Tellechea ............... B64D 45/08 |
| 2019/0027048 A1* | 1/2019 | Smith .................. G01C 23/005 |

* cited by examiner

SYSTEMS AND METHODS FOR DYNAMIC IMPLEMENTATION OF INCREASED GLIDE SLOPE ANGLES IN APPROACH PROCEDURES

TECHNICAL FIELD

The technical field generally relates to aircraft guidance systems, and more particularly relates to systems and related operating methods for dynamic implementation of increased glide slope angles in approach procedures.

BACKGROUND

The phase of flight prior to landing an aircraft is referred to as "approach," or an approach procedure. Generally, each runway or landing area has a respective approach procedure, which is a pre-published set of maneuvers that a pilot follows. Each approach procedure includes a designated glide slope angle for an aircraft to follow in a part of a flight plan referred to as a final approach segment. The final approach segment is runway-specific (or landing area-specific), and generally begins at an altitude/position referred to as a final approach fix (FAF) and ends at a touchdown point on the associated runway. A database (often called the Navigation database) may be used to store a plurality of approach procedures for reference during aircraft operation.

To accommodate and support an increase in traffic at airports, it is desirable for aircraft to increase their glide slope angles over that which is published whenever possible. Utilizing increased glide slope angles may also provide the benefit of reducing environment (noise and emissions) impact over the designated glide slope angles in respective published approach procedures. However, conditions may exist at the final capture altitude that would restrict the use of an increased glide slope angle. Therefore, systems and methods capable of evaluating real time effects of implementing an increased glide slope angle at an associated final capture altitude and providing related pilot selectable options are desirable. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an exemplary embodiment, a method for glide slope evaluation for an aircraft is provided. The method comprising: in a control module, retrieving, from a navigation database (NDB), a designated approach procedure; identifying a designated glide slope angle (D_GSA) based on the designated approach procedure; receiving sensor data providing environmental information near the aircraft; receiving navigation data providing a location and heading of the aircraft; generating an adaptive glide slope angle (A_GSA) and an associated final capture altitude (FCA) based on the sensor data; determining whether (a) an altitude constraint applies at the FCA; determining whether (b) a level segment exists at the FCA; enabling modification of the designated approach procedure with the A_GSA, upon concurrence of (a) and (b); and barring modification of the designated approach procedure with the A_GSA when there is no concurrence of (a) and (b).

In another embodiment, a system for glide slope evaluation in an aircraft is provided. The system comprising: a navigation database providing a designated approach procedure; a navigation system providing a location and a heading of the aircraft; an on-board sensor system providing environmental status information near the aircraft; a control module operationally coupled to the navigation database and the on-board sensor system, the control module configured to, identify a designated glide slope angle (D_GSA) based on the designated approach procedure; generate an adaptive glide slope angle (A_GSA) and an associated final capture altitude (FCA) based on the environmental status information; determine whether (a) an altitude constraint applies at the FCA; determine whether (b) a level segment exists at the FCA; enable modification of the designated approach procedure with the A_GSA, upon concurrence of (a) and (b); and prevent modification of the designated approach procedure with the A_GSA when there is no concurrence of (a) and (b).

Also provided is a method for glide slope evaluation for an aircraft, the method comprising: in a control module operationally coupled to a navigation database and a navigation system, identifying a designated glide slope angle (D_GSA) based on a designated approach procedure; receiving sensor data providing environmental information near the aircraft; generating an adaptive glide slope angle (A_GSA) and an associated final capture altitude (FCA) based on the sensor data and navigation data; determining when (a) an altitude constraint applies at the FCA, and (b) a level segment exists at the FCA; enabling modification of the designated approach procedure with the A_GSA, when (a) and (b) concurrently true; and barring modification of the designated approach procedure with the A_GSA when (a) and (b) are not concurrently true.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module, and may be separate from, or integrated within, a preexisting mobile platform management system or aircraft flight management system (FMS).

Exemplary embodiments of the novel disclosed glide slope evaluation system (FIG. 1, 102) provide technologically improved systems and methods for determining when an increased glide slope angle (over the respective published glide slope angle) may be employed. The system processes real-time environmental data, navigation data, and real-time avionics system(s) status data to generate a potential increased glide slope angle for a final segment procedure. The generated increased glide slope angle is larger than the published glide slope angle, leading to a steeper final segment. As used herein, steeper means having a larger "rise over run," or numerator over denominator. After generating the increased glide slope angle, the disclosed glide slope evaluation system 102 determines whether implementing the increased glide slope angle is prohibited by altitude constraints at an associated final capture altitude. The figures and descriptions below provide more detail.

Figure 1:
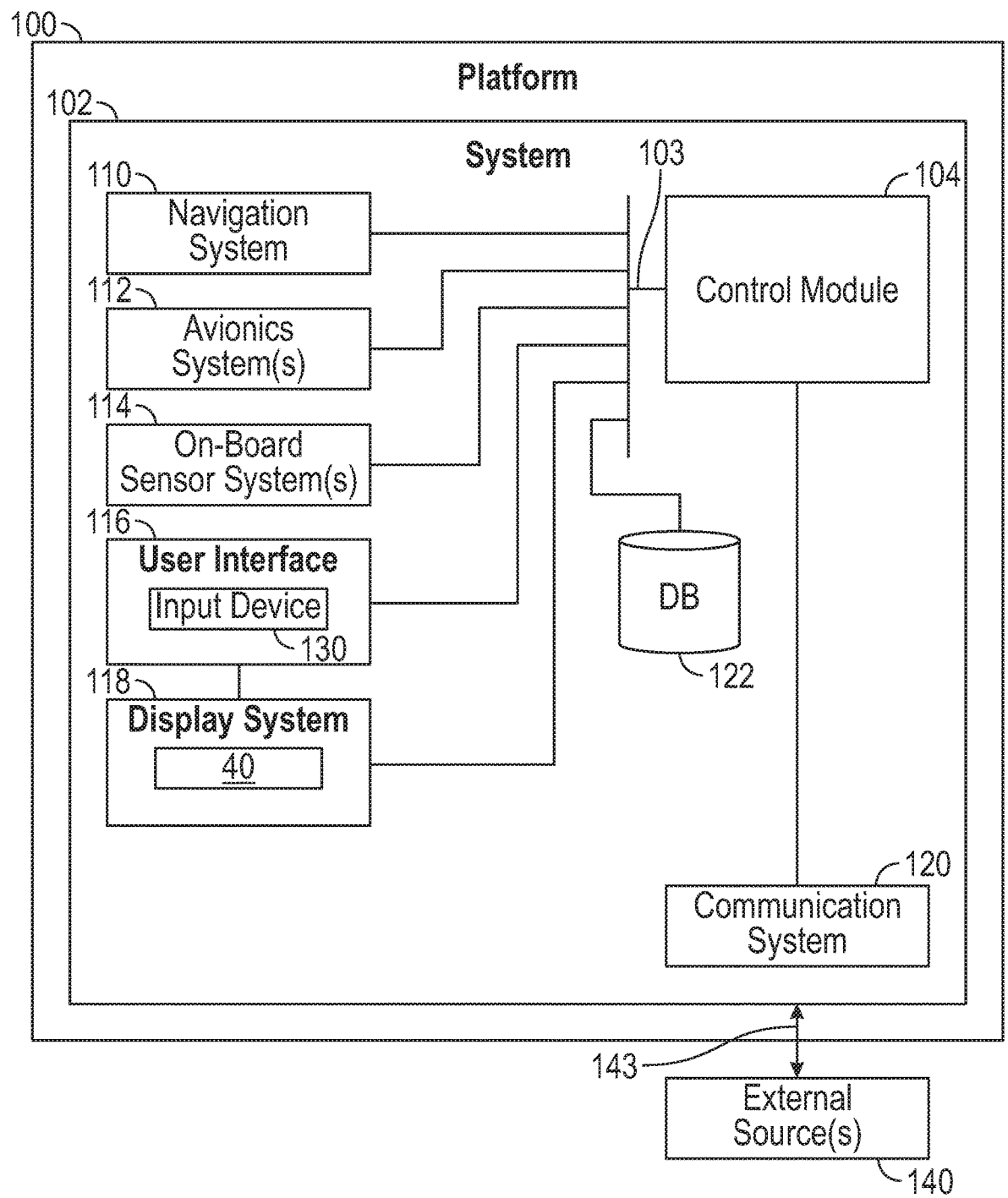
FIG. 1 is a block diagram of a glide slope evaluation system, in accordance with an exemplary embodiment.

Turning now to FIG. 1, in an embodiment, the glide slope evaluation system 102 (also referred to herein as "system" 102) is generally located in a mobile platform 100. In various embodiments, the mobile platform 100 is an aircraft, and is referred to as aircraft 100. The system 102 embodies a control module 104. Although the control module 104 is shown as an independent functional block, onboard the aircraft 100, it may exist externally of the aircraft 100, such as in an electronic flight bag (EFB). The control module 104 may also be separate from, or integrated within, a preexisting mobile platform management system, avionics system, cockpit display system (CDS), flight controls system (FCS), or aircraft flight management system (FMS).

The control module 104 performs the functions of the system 102. In order to perform these functions, the control module 104 may be operatively coupled, generally via a bus 103, to any combination of the following aircraft systems: a navigation system 110, one or more avionics systems 112, one or more on-board sensor systems 114, a user interface 116, a display system 118, a communications system 120, and one or more data storage elements (DB) 122. The functions of these aircraft systems, and their interaction, are described in more detail below.

Still referring to FIG. 1, in an exemplary embodiment, the control module 104 is coupled to the navigation system 110, which, as used herein, comprises a flight management system FMS and a flight plan database. As used herein, "real-time" is interchangeable with current and instantaneous. The navigation system 110 is configured to provide real-time navigational data and/or information regarding operation of the aircraft 100, including real-time flight guidance for aircraft 100. The navigation system 110 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the navigation system 110, as will be appreciated in the art. The navigation system 110 can obtain and/or determining the current position of the aircraft 100, that is, (i) the instantaneous location of the aircraft 100 (e.g., the latitude and longitude) and (ii) the instantaneous altitude (or height above ground level) for the aircraft 100. The navigation system 110 is also capable of obtaining or otherwise determining the instantaneous heading of the aircraft 100 (i.e., the direction the aircraft is traveling in relative to some reference), and to compare the instantaneous position and heading of the aircraft 100 with an intended flight plan for the aircraft 100. The various real-time data, information, and guidance, determined by the navigation system 110, are referred to herein, interchangeably, as "navigation data" and as "aircraft status data," and may additionally comprise current phase of flight information. Navigation data is made available via bus 103 such that one or more of the other onboard systems 112, 114, 116, 118, 120, and the control module 104, may further process and/or handle the navigation data.

The avionics system(s) 112 include numerous systems for obtaining and/or providing real-time flight-related data and information. For example, avionics systems 112 may include any combination of: a weather system, an air traffic management system, a radar system, a traffic avoidance system, an autopilot system, an auto thrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system. As may be appreciated, each avionics system of the various avionics systems 112 may have, associated therewith, appropriate respective sensors that sense, detect, or otherwise identify, in real-time, status of the avionics system, subsystem, surface, component, line replacement unit (LRU), or the like. Each of these avionics systems 112 thereby generates respective data; the entirety of this real-time data from the avionics system(s) 112 is referred to herein as avionics systems data. Real-time avionics systems data is made available via bus 103 such that one or more of the other onboard systems 110, 114, 116, 118, 120, and the control module 104, may further process and/or handle the avionics systems data.

The on-board sensor system(s) 114 provide a respective real-time environmental status of regions of interest near the aircraft 100. For example, an on-board sensor system 114 may be realized as a weather radar system or other weather sensing system that measures, senses, or otherwise detects real-time meteorological conditions near the aircraft 100. The on-board sensor system 114 may also include object detection systems, and provide object data and information near the aircraft 100. The sensor data, therefore, comprises real-time environmental data near the aircraft 100, which includes data and information about objects, and data and information about weather. The sensor system(s) 114 provides sensor data via bus 103 such that one or more of the other onboard systems 110, 112, 116, 118, 120, and control module 104 may further process and/or handle the sensor data.

The user interface may include a user input device 130. The user input device 130 is coupled to the control module 104, and the user input device 130 and the control module 104 are cooperatively configured to allow a user (e.g., a pilot, co-pilot, or crew member) to interact with the display devices in the display system 118 and/or other elements of the system 102, as described in greater detail below. Depending on the embodiment, the user input device 130 may be realized as a keypad, touchpad, keyboard, mouse, touch panel (or touchscreen), joystick, knob, line select key or another suitable device adapted to receive input from a user. When the user input device 130 is configured as a touchpad or touchscreen, it may be integrated with the display system 118.

The control module 104 may be coupled to a communications system 120, which is configured to support communications between external source(s) 140 and the aircraft 100 via the communications link 143. External source(s) 140 may comprise air traffic control (ATC), neighboring aircraft, sources of weather information, and other suitable command centers and ground locations. Non-limiting examples of data received from the external source(s) 140 include, for example, instantaneous (i.e., real time or current) air traffic control (ATC) communications, traffic collision and avoidance system (TCAS) data from other aircraft, automatic dependent surveillance broadcast (ADS-B) data, and weather communications. In addition, an external data source 140 may be used to load or program a flight plan into the system 102 (generally, into a flight plan database in the navigation system 110). Accordingly, the communications system 120 and communications link 143 may include a data link system, automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 140. In this regard, the communications system 120 may allow the aircraft 100 to receive information that would otherwise be unavailable to the pilot and/or co-pilot using the onboard systems 110, 112, 114, 116.

In various embodiments, and generally via bus 103, any combination of the navigation system 110, avionics system (s) 112, onboard sensor system(s) 114, and communications system 120, may be coupled to the display system 118 such that the display system 118 may generate or render, on a display device, real-time information associated with the respective components. Coupled in this manner, the navigation system 110, avionics system(s) 112, onboard sensor system(s) 114, and communications system 120 are configured to support navigation, flight planning, and other aircraft control functions in a conventional manner, as well as to provide real-time data and/or information regarding the operational status of the aircraft 100 to the control module 104.

The renderings of the display system 118 may be processed by a graphics system, components of which may be integrated into the display system 118 and/or be integrated within the control module 104. Display methods include various types of computer generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various techniques for visually distinguishing objects. The control module 104 is said to display various images and selectable options described herein. In practice, this may mean that the control module 104 generates display commands, and responsive to receiving the display commands from the control module 104, the display system 118 displays, renders, or otherwise visually conveys on a display device, one or more graphical representations or images described herein. The display system may also render graphical representations or images associated with operation of the aircraft 100, and specifically, a multi-function display (MFD) 40 described below.

In exemplary embodiments, the MFD 40 is realized on one or more electronic display devices configured as a combination of a vertical situation display (VSD) and a lateral navigation display (ND). The VSD renders a graphical representation of the aircraft 100 and one or more of the airspace, air traffic, navigational reference points, and a vertical flight plan associated with a flight plan of the aircraft 100. The ND renders a top down graphical representation of the aircraft 100 and one or more of the terrain, meteorological conditions, airspace, air traffic, navigational reference points, and a route associated with a lateral flight plan of the aircraft 100. Each of the VSD and ND are responsive to display commands from the control module 104 and/or display system 118. In this regard, the control module 104 and the display system 118 are cooperatively configured to generate the display commands for the MFD 40, including the various user interface elements, such as menus and buttons, described below.

The data storage element or database DB 122 is a storage location and may maintain a navigation database (NDB) of flight plans, as well as information regarding terrain and airports and/or other potential landing locations (or destinations) for the aircraft 100. In this regard, the DB 122 can maintain an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the DB 122 also maintains airport status data for the runways and/or taxi paths at the airport indicating if a particular runway and/or taxi path is currently operational along with directional information for the taxi paths (or portions thereof).

As mentioned, the control module 104 performs the functions of the system 102. As used herein, the term "module" refers to any hardware, software, firmware, electronic control component, processing logic, and/or processor device, individually or in any combination, configured as a means for facilitating communications and/or interaction between the elements of the system 102 and performing additional processes, tasks and/or functions to support operation of the system 102, as described herein. Depending on the embodiment, the control module 104 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Figure 2:
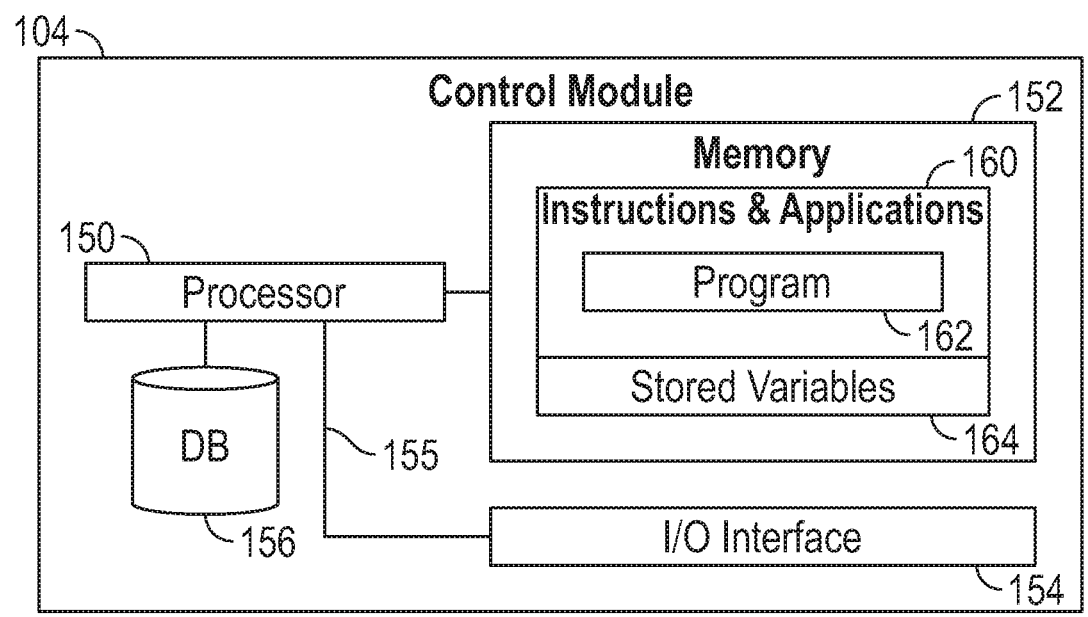
FIG. 2 is a block diagram of a control module for a glide slope evaluation system, in accordance with an exemplary embodiment.

As depicted in FIG. 2, in various embodiments, the control module 104, includes a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 maintains data bits and may be utilized by the processor 150 as storage and/or a scratch pad. The memory 152 may be located on and/or co-located on the same computer chip as the processor 150. In the depicted embodiment, the memory 152 stores instructions and applications 160 and one or more configurable variables in stored variables 164. Information in the memory 152 may be organized and/or imported from an external data source 140 during an initialization step of a process; it may also be programmed via a user input device 130.

A novel program 162 is embodied in the memory 152 (e.g., RAM memory, ROM memory, flash memory, registers, a hard disk, or the like) or another suitable non-transitory short or long-term storage media capable of storing computer-executable programming instructions or other data for execution. The program 162 includes rules and instructions which, when executed, cause the system 102 to perform the functions, techniques, and processing tasks associated with the operation of the system 102 described herein.

Based in part on being programmed with program 162, the processor 150 and the memory 152 form a novel processing engine that performs the processing activities of the system 102. During operation, the processor 150 loads and executes one or more programs, algorithms and rules embodied as instructions and applications 160 contained within the memory 152 and, as such, controls the general operation of the control module 104 as well as the system 102. In executing the process described herein, the processor 150 specifically loads and executes the instructions embodied in the program 162. Additionally, the processor 150 is configured to, in accordance with the program 162: process received inputs (selectively, any combination of input from the set including: external data sources 140, the navigation system 110, avionics system(s) 112, on-board sensor system(s) 114, the user interface 116, the display system 118, and the communications system 120); reference any of the databases; determine glide slope angle and evaluate them with respect to a final capture altitude; and, generate display commands that command and control the display system 118.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components (i.e., via bus 103), and between the control module 104 and the external data sources 140. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156. In one embodiment, the I/O interface 154 obtains data from external data source(s) 140 directly.

The database 156 may include an aircraft-specific parameters database (comprising aircraft-specific parameters for aircraft 100, as well as for a variety of other aircrafts) and parameters and instructions for processing user inputs and rendering images on the MFD 40, as described herein. In some embodiments, the database 156 is part of the memory 152. In various embodiments, the database 156 and the database 122 are integrated, either within the control module 104 or external to the control module 104.

The images displayed on the MFD 40 are understood to be based on current aircraft status data for the aircraft 100 and to be dynamically updated based on continuously obtaining the current aircraft status data. As used herein, a "viewing segment" is at least a portion of a flight plan for the aircraft 100; each MFD 40 image depicts the same viewing segment on each of the VSD and ND.

It will be appreciated that system 102 may differ from the embodiment depicted in FIG. 1. As a first example, in various embodiments, any combination of the user input device 130, the communications system 120, and the display system 118 can be integrated, for example, as part of an existing FMS or cockpit display in an aircraft. In another example, the on-board sensor system 114 may be disintegrated, and comprise multiple sensor systems distributed around the aircraft and interacting individually with the control module 104. Regardless of the state of integration of these systems, a user may control one or more features of the system 102 by providing user input via at least the user input device 130.

Figure 3:
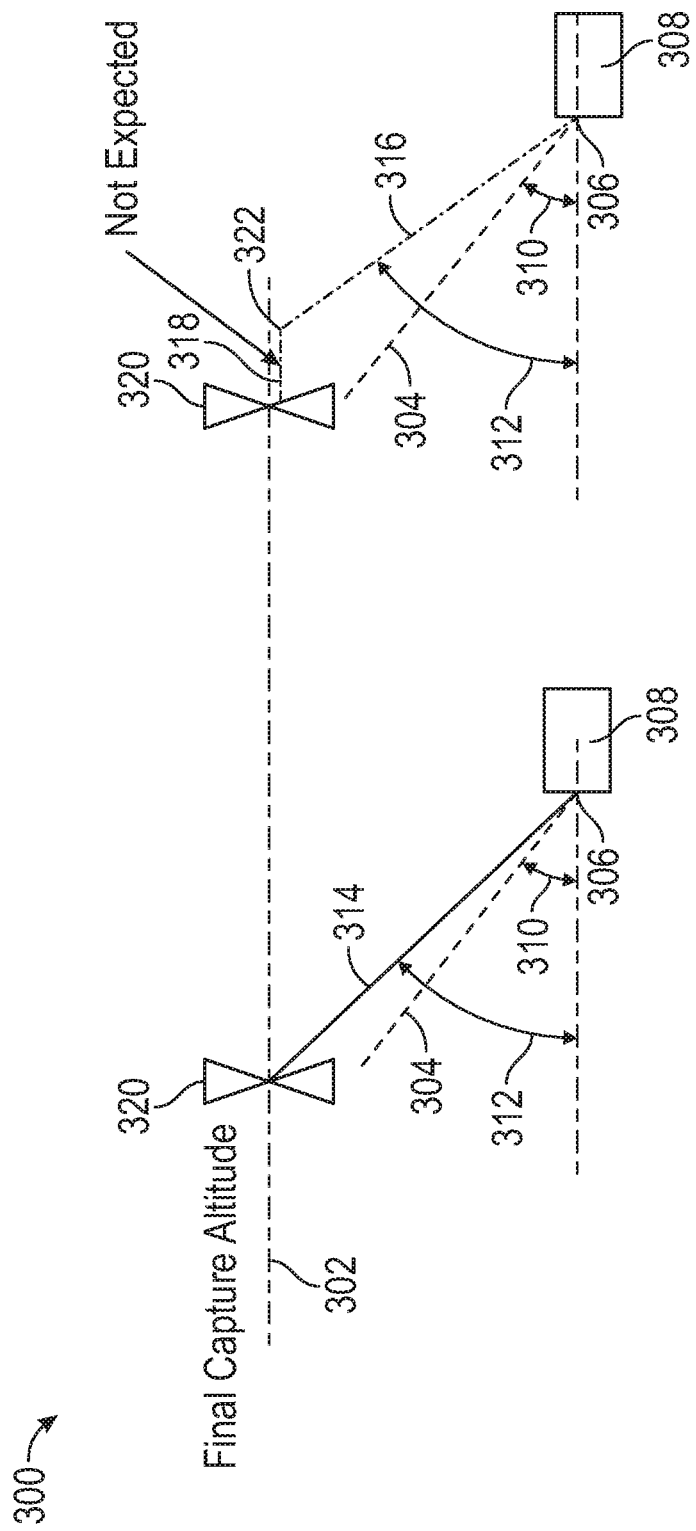
FIG. 3 is an illustration showing a final capture altitude with, and without a level segment associated with a generated adaptive glide slope angle, in accordance with various exemplary embodiments.

Turning now to FIG. 3, some relevant measurements and features are depicted and described. A designated approach procedure for the aircraft 100 includes a path 304 to an intersection point 306 on a landing threshold of a runway 308. It is understood that the landing threshold may extend perpendicularly across a width of the runway 308, and the intersection point 306 is a generalized spot on the landing threshold at which the aircraft 100 will first make contact with the runway 308. The designated approach procedure has a designated glide slope angle D_GSA 310. During operation, the control module 104 processes data from the on-board sensor system 114 (sensed actual/current weather data from weather sensors) and real-time aircraft status data (from avionics systems 112), and generates an adaptive glide slope angle A_GSA 312 based thereon. As mentioned, the A_GSA 312 is larger than the D_GSA 310; this may reflect any combination of (i) very favorable weather (i.e., low winds, high visibility, no or light precipitation) near the aircraft 100, (ii) an object-free zone around the aircraft 100 (i.e., distance to a neighbor traffic is within safety margins), and/or (iii) that a variety of avionics systems in aircraft 100 are operating optimally (i.e., engines, braking mechanisms, fuel levels, aircraft weight). In one embodiment, a ratio of the generated A_GSA 312 to the D_GSA 310 is less 1.5. Implementing the A_GSA 312 means, at a final capture altitude 302, moving the aircraft 100 from its path 304 to path 314, which is visibly steeper than path 304. Path 314 also intersects with on the landing threshold of the runway 308 at the intersection point 306. The final capture altitude 302 may be a final approach fix (FAF) or a glide slope intercept altitude (GSIA).

After generating the A_GSA 312, the control module 104 determines whether or not the A_GSA 312 is compatible with the designated approach procedure before making the A_GSA 312 an available and selectable option for the pilot. The A_GSA 312 is compatible with the designated approach procedure if it results in a final segment that is compatible with the designated approach procedure. For any A_GSA 312 that is determined to be compatible with the designated approach procedure, the modification to the approach procedure is made selectively available to the pilot. It is selectable, because it is made available via prompting on the user interface 116, and the pilot may select to modify the flight plan with it, but the pilot may select not to make the modification. Making the A_GSA 312 an available and selectable option for the pilot may mean commanding the display system 118 to (i) render selectable buttons on the MFD 40, (ii) render, in a first line style, a final segment that employs the D_GSA 310, (iii) render, in a second line style that is different than the first line style, a final segment that employs the A_GSA 312, and/or any combination thereof.

In various embodiments, a determination that the A_GSA 312 is not compatible with the designated approach procedure comprises determining that there is an altitude constraint 320 at the final capture altitude 302. Following other approaches, the existence of the altitude constraint 320 at the final capture altitude 302 is considered an unworkable scenario, and forecloses making the A_GSA 312 an available selectable option for the pilot; i.e., the A_GSA 312 is unavailable.

A technological effect of the present disclosure is the opening of some of the previously foreclosed scenarios, thereby expanding a total number of scenarios in which a final approach segment may be selectively modified by a user to implement the A_GSA 312. Particularly, the system 102 allows implementation of a larger A_GSA 312 in some cases in which there is an altitude constraint 320 at the final capture altitude 302. In altitude constraint scenarios allowed by the system 102, the aircraft 100 must be flown along a level segment 318 (measured along the level segment 318, from the approach geometry 320 to an endpoint 322) prior to descending toward the landing target, thereby implementing the A_GSA 312 in the final approach. This methodology is illustrated in FIGS. 4-7.

Turning now to FIGS. 4-7, and with continued reference to FIGS. 1 and 2, scenarios in which there is altitude constraint 320 at the final capture altitude 302 are described in more detail. A level segment is a lateral segment at the final capture altitude 302. In some scenarios, such as continuous descent operations, final approach segment altitude constraints do not create undue level segments preventing unconstrained/continuous descent. The control module 104 may find flight plans and final approach segment altitude constraints in a navigation database (NDB), such as in database 122 or 156.

Figure 4:
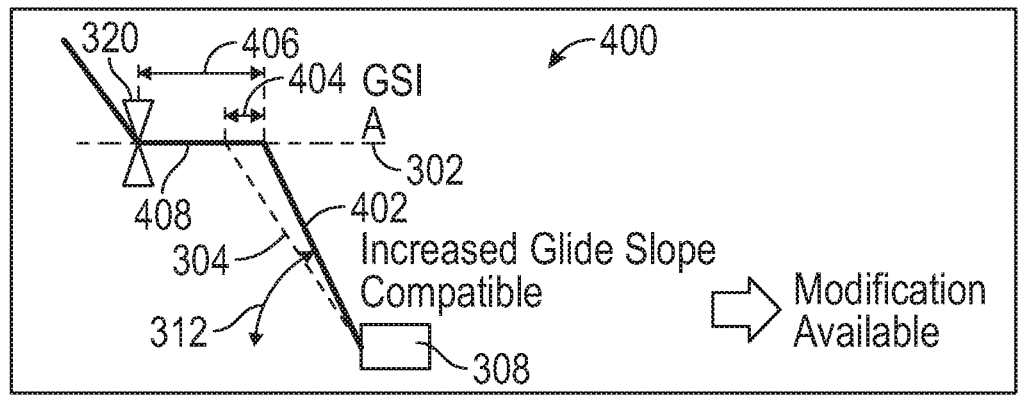
FIGS. 4-6 are illustrations showing various scenarios at a final capture altitude, in accordance with various exemplary embodiments.

A first scenario is depicted in image 400. In FIG. 4, it is determined that (a) there is an altitude constraint at the FCA 302. And, it is also determined that (b) there is a level segment 408 at the FCA 302. Therefore, a and b are concurrent. Level segment 408 extends a length 406 from the approach geometry 320 at the final capture altitude FCA 302. At the end of the level segment 408, the published flight path 304 extends directly from the final capture altitude 302 to the landing threshold 308. Implementation of the determined A_GSA 312 involves increasing the level segment by segment 404, such that the modified flight path 402 includes level segment 406. The scenario in FIG. 4 is an allowable modification to the flight path, and the modification is made selectively available to the pilot.

Figure 5:
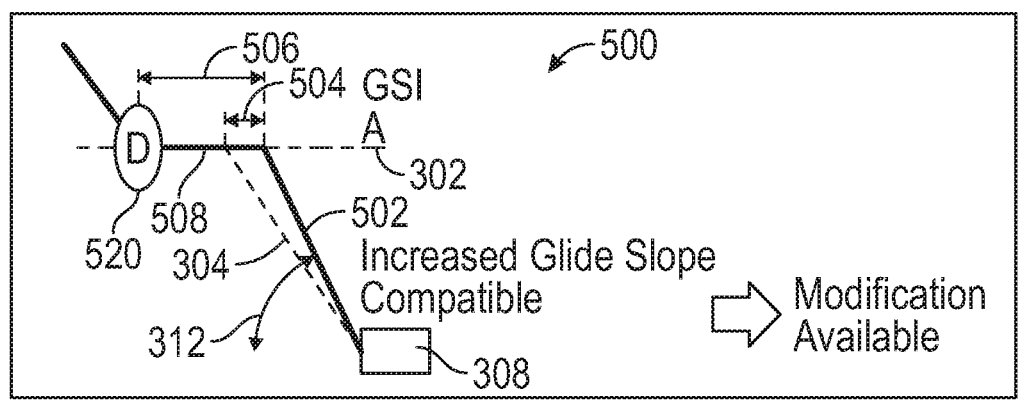

Another scenario is depicted in image 500. In FIG. 5, it is determined that (b) there is a level segment 508 at the FCA 302. Level segment 508 extends a length 506 from the approach geometry 520 at the final capture altitude FCA 302. The approach geometry is an approach deceleration command (symbol 520 "D") which introduces a deceleration segment. The published flight path 304 comprises a level segment 508 extending from the approach deceleration command 520 at the final capture altitude 302. At the end of the level segment 508, the published flight path 304 extends from the final capture altitude 302 directly to the landing threshold 308. Implementation of the determined A_GSA 312 involves increasing the level segment by segment 504, such that the modified flight path 502 includes level segment 506. In this scenario, it is also determined that (a) an altitude constraint at the FCA 302 causes the deceleration segment. Therefore, a and b are concurrent. The scenario in FIG. 5 is an allowable modification to the flight path, and the modification is made selectively available to the pilot.

Figure 6:
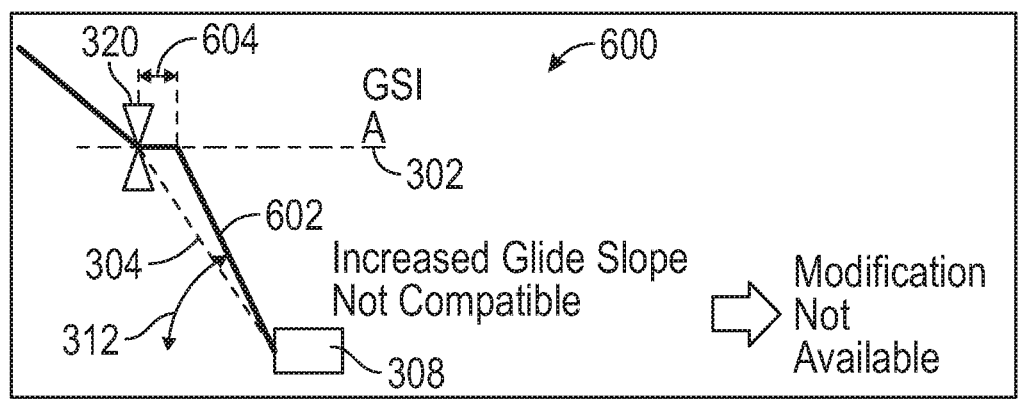

A third scenario is depicted in image 600. In FIG. 6, it is determined that (a) there is an altitude constraint at the FCA 302. It is also determined that (b) there is not a level segment at the FCA 302. Therefore, there is no concurrence of a and b. The published flight path 304 vectors directly from the approach geometry 320 at the final capture altitude 302 to the runway threshold 308. This may be referred to as a continuous descent. A level segment doesn't exist and is not permitted in this scenario. Implementation of the determined A_GSA 312 would involve a modified flight path 602 that adds a level segment 604. Therefore, modification of the final approach segment is barred (i.e., prevented) and not available in the scenario of FIG. 6.

As mentioned, upon determining that that the A_GSA 312 is not compatible with the designated approach procedure, the control module 104 does not allow modification of the designated approach procedure with the A_GSA 312. In addition, the control module 104 may also generate an alert. The alert may be a rendered on an image on MFD 40, or interactive user interface on the display system 118, and may employ any of various known visually distinguishing techniques, such as text changes, color changes, highlighting, blinking, and the like.

Figure 7:
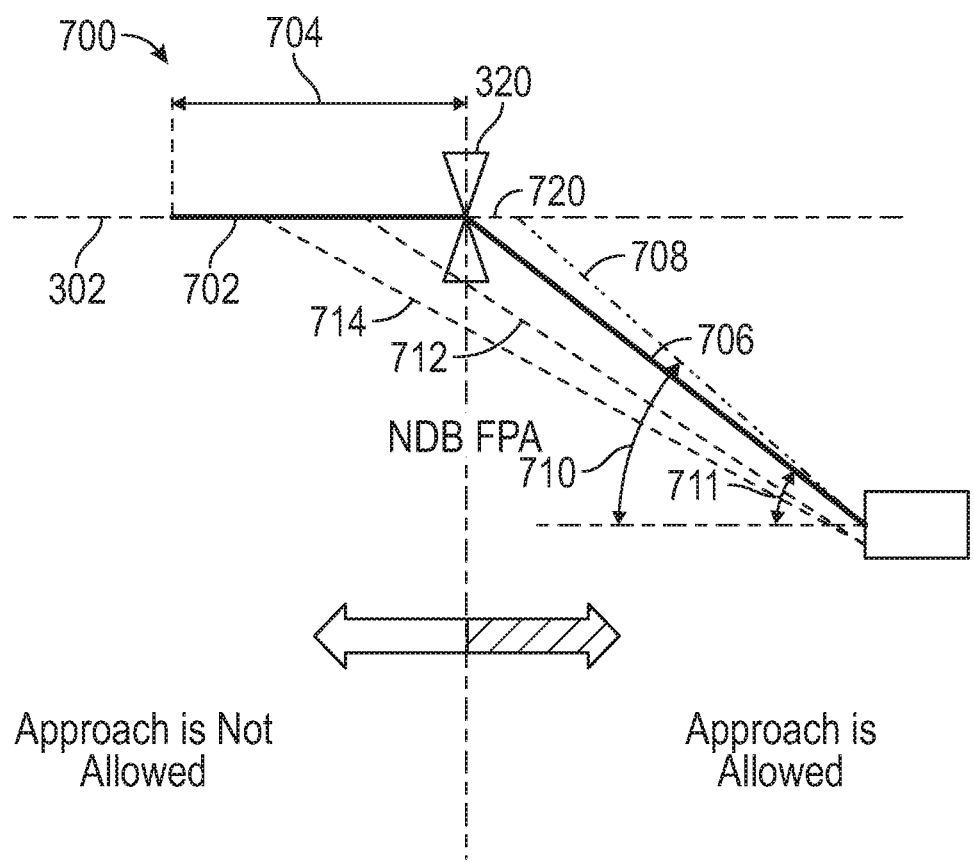
FIG. 7 is an illustration showing a variety of approach angles and their respective compatibility with a generated, enhanced glide slope angle, in accordance with various exemplary embodiments.

In FIG. 7, these concepts are summarized in a collective image 700. In FIG. 7, it is determined that (a) there is an altitude constraint at the FCA 302. It is also determined that (b) there is a level segment at the FCA. A published flight path is depicted showing a level segment 702 (extending to length 704) and descent 706. As mentioned, the A_GSA 312 generated and analyzed herein are larger than the D_GSA 310, supporting a steeper final descent. FIG. 7 provides a perspective that glide slope angles less than the D_GSA 711 are not allowed by the system 102, as they violate the altitude constraint (which, in the figures, appears that they shorten or remove level segment 702), but a glide slope angle larger than D_GSA 711, such as A_GSA 710, that increase the level segment 704 (by segment 720), are allowed. This is because when A_GSA 710 is larger than D_GSA 711, the result is an extension of the existing level segment 702. An approach that extends the level segment 702 to the right of approach geometry 320, such as path 708 at A_GSA 710, is an allowed modification. A potential approach that shortens or removes level segment 702, such as path 712 and path 714, is not allowable.

Figure 8:
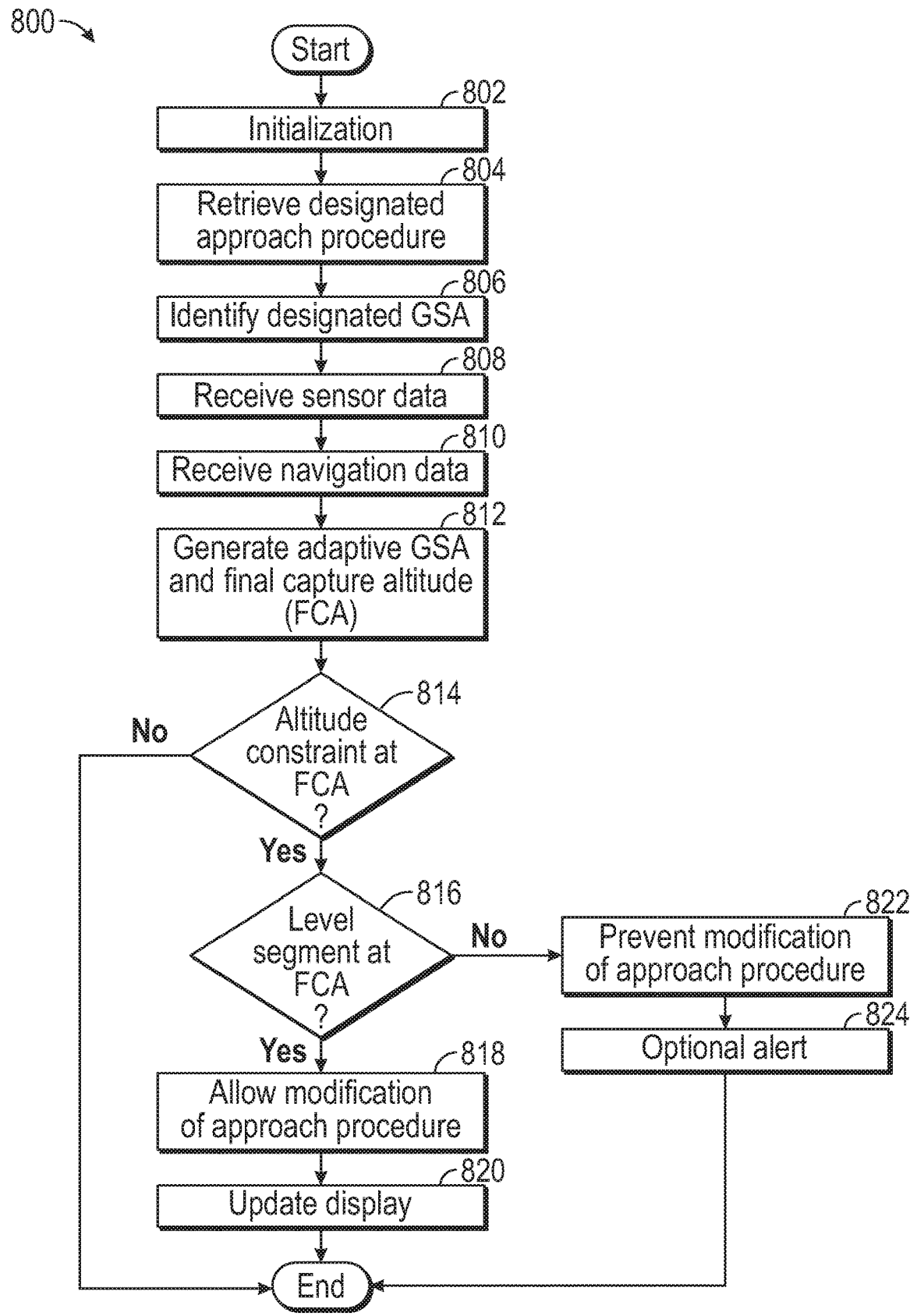
FIG. 8 is a flow chart for a method for glide slope evaluation, in accordance with various embodiments.

As mentioned, the processor 150 and the program 162 form an enhanced glide slope evaluation engine that continually, and in real time, processes various data received from the bus 103 and generates potential increased glide slope angles for use in a final segment in accordance with a set of rules encoded in the program 162. Referring now to FIG. 8 and with continued reference to FIGS. 1-7, a flow chart is provided for a method 800 for providing a system 102, in accordance with various exemplary embodiments. Method 800 represents various embodiments of a method associated for providing an enhanced interactive adaptive glide slope angle for pilot selection. For illustrative purposes, the following description of method 800 may refer to elements mentioned above in connection with FIG. 1. In practice, portions of method 800 may be performed by different components of the described system. It should be appreciated that method 800 may include any number of additional or alternative tasks, the tasks shown in FIG. 6 need not be performed in the illustrated order, and method 800 may be incorporated into a more comprehensive procedure or method having additional functionality not described in detail herein. Moreover, one or more of the tasks shown in FIG. 8 could be omitted from an embodiment of the method 800 as long as the intended overall functionality remains intact.

The method starts, and at 802 the control module 104 is initialized. As mentioned above, initialization may comprise uploading or updating instructions and applications 160, program 162, stored variables 164, and the various lookup tables stored in the database 156. Predetermined variables may include, for example, predetermined distances and times to use as thresholds, parameters for setting up a user interface, and the various shapes, various colors and/or visually distinguishing techniques used for icons and alerts. In an embodiment, at 802, the method 800 initializes navigational map data in the database 156. In some embodiments, program 162 includes additional instructions and rules for rendering information differently based on type of display device in display system 118. Initialization at 802 may also include identifying external sources 140 and/or external signals 143.

At 804, a designated approach procedure is retrieved, generally from a navigation database, such as database 122. At 806, the designated glide slope angle D_GSA 310 is identified from the designated approach procedure. At 808 sensor data is received from the on-board sensor systems 114, and at 810 navigation data is received from the navigation system 110. At 812, a larger glide slope angle, A_GSA 312, is generated, and an associated final capture altitude (FCA) is determined based on the processed navigation data and sensor data. When there is an altitude constraint at FCA (814) and there is a level segment at FCA (816), the method enables or allows the modification of the approach procedure with the A_GSA 312 at 818. Modification of the approach procedure is supported by the user input device 130 in cooperation with the display system 118. Allowing modification of the approach procedure may include prompting the user with selectable options, via one or more display techniques, on the display system 118, and receiving a user selection responsive to the prompting, the user selection provided via the user input device 130 in response to the prompting. Accordingly, after allowing modification of the approach procedure, the user may modify the approach procedure, or may decline to modify the approach procedure. The user input responsive to the selectable options may prompt the method to update an image on the display system 118, such as on the MFD 40 at 820 and then end. Updating the image on the display system 118 may therefore comprise displaying the user's selected final segment.

When there is an altitude constraint at the FCA (814) but there is no level segment at the FCA (816), the method 800 prevents or bars modification of the approach procedure at 822. When modification of the approach procedure is barred, an optional alert may be generated at 824. If there is no altitude constraint at 814, the method 800 ends.

As is readily appreciated, the above examples of the glide slope evaluation system 102 are non-limiting, and many others may be addressed by the control module 104. Thus, systems and methods directed to improvements in the presentation and use of glide slope angles during approach over conventional guidance systems are provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A method for glide slope evaluation for an aircraft, the method comprising:
   in a control module,
   retrieving, from a navigation database (NDB), a designated approach procedure;
   identifying a designated glide slope angle (D_GSA) from a final capture altitude (FCA) to an intersection point on a landing threshold of a runway, based on the designated approach procedure;
   receiving sensor data from on-board sensors providing real-time environmental information near the aircraft;
   receiving real-time navigation data providing a real-time aircraft location and heading of the aircraft;
   receiving real-time avionics systems data including engine systems data, autopilot data, and auto-thrust data;
   determining that an engine system, an autopilot system, and an auto-thrust system are operating optimally based on the avionics data;
   generating an adaptive glide slope angle (A_GSA) from the FCA to the intersection point on the landing threshold of the runway, the A_GSA being larger than the D_GSA, the A_GSA being reflective of the real-time navigation data, real-time sensor data, and optimal operation of the engine system, the autopilot system, and the auto-thrust system;
   determining whether (a) an altitude constraint applies at the FCA;
   determining whether (b) a level segment exists at the FCA;
   enabling modification of the designated approach procedure with the A_GSA, upon concurrence of (a) and (b); and
   barring modification of the designated approach procedure with the A_GSA when there is no concurrence of (a) and (b).

2. The method of claim 1, wherein the FCA is one from the set including: a glide slope intercept altitude (GSIA) and a final approach fix (FAF).

3. The method of claim 2, further comprising generating an alert when there is no concurrence of (a) and (b).

4. The method of claim 2, wherein generating the adaptive glide slope angle (A_GSA) and the associated final capture altitude (FCA) is further based on determining that there is favorable weather near the aircraft.

5. The method of claim 4, wherein generating the adaptive glide slope angle (A_GSA) and the associated final capture altitude (FCA) is further based on determining that there is an object free zone near the aircraft.

6. The method of claim 5, wherein generating the adaptive glide slope angle (A_GSA) and the associated final capture altitude (FCA) is further based on determining that aircraft braking mechanisms are working properly.

7. The method of claim 2, wherein a ratio of the generated A_GSA to the D_GSA is less than 1.5.

8. The method of claim 6, further comprising updating an image on a display system subsequent to enabling modification of the designated approach procedure.

9. A system for glide slope evaluation in an aircraft, the system comprising:
- a navigation database providing a designated approach procedure;
- a navigation system providing a real-time aircraft location and a heading of the aircraft;
- an on-board sensor system providing real-time environmental status information near the aircraft;
- avionics systems providing real-time avionics systems data including engine systems data, autopilot data, and auto-thrust data;
- a control module operationally coupled to the navigation database, navigation system, avionics systems, and the on-board sensor system, the control module configured to,
  - identify a designated glide slope angle (D_GSA) from a final capture altitude (FCA) to an intersection point on a landing threshold of a runway, based on the designated approach procedure;
  - determine that an engine system, an autopilot system, and an auto-thrust system are operating optimally based on data received from the avionics systems;
  - generate an adaptive glide slope angle (A_GSA) from the FCA to the intersection point on the landing threshold of the runway, the A_GSA being larger than the D_GSA, the A_GSA being reflective of the real-time navigation data, data from the on-board sensor system, and optimal operation of the engine system, the autopilot system, and the auto-thrust system;
  - determine whether (a) an altitude constraint applies at the FCA;
  - determine whether (b) a level segment exists at the FCA;
  - enable modification of the designated approach procedure with the A_GSA, upon concurrence of (a) and (b); and
  - prevent modification of the designated approach procedure with the A_GSA when there is no concurrence of (a) and (b).

10. The system of claim 9, wherein the FCA is one from the set including: a glide slope intercept altitude (GSIA) and a final approach fix (FAF).

11. The system of claim 10, wherein the control module is further configured to generate an alert when there is no concurrence of (a) and (b).

12. The system of claim 10, wherein the control module is further configured to generate the adaptive glide slope angle (A_GSA) and the associated final capture altitude (FCA) based on determining that there is favorable weather near the aircraft.

13. The system of claim 12, wherein the control module is further configured to generate the adaptive glide slope angle (A_GSA) and the associated final capture altitude (FCA) based on determining that there is an object free zone near the aircraft.

14. The system of claim 13, wherein the control module is further configured to generate the adaptive glide slope angle (A_GSA) and the associated final capture altitude (FCA) based on determining that aircraft braking mechanisms are working properly.

15. The system of claim 14, wherein a ratio of the generated A_GSA to the D_GSA is less than 1.5.

16. The system of claim 15, the control module is further configured to update an image on a display system, subsequent to enabling modification of the designated approach procedure.

* * * * *